Feb. 22, 1949.   G. H. HOWARD   2,462,266
STATIC WHEEL BALANCING APPARATUS
Filed Aug. 3, 1946
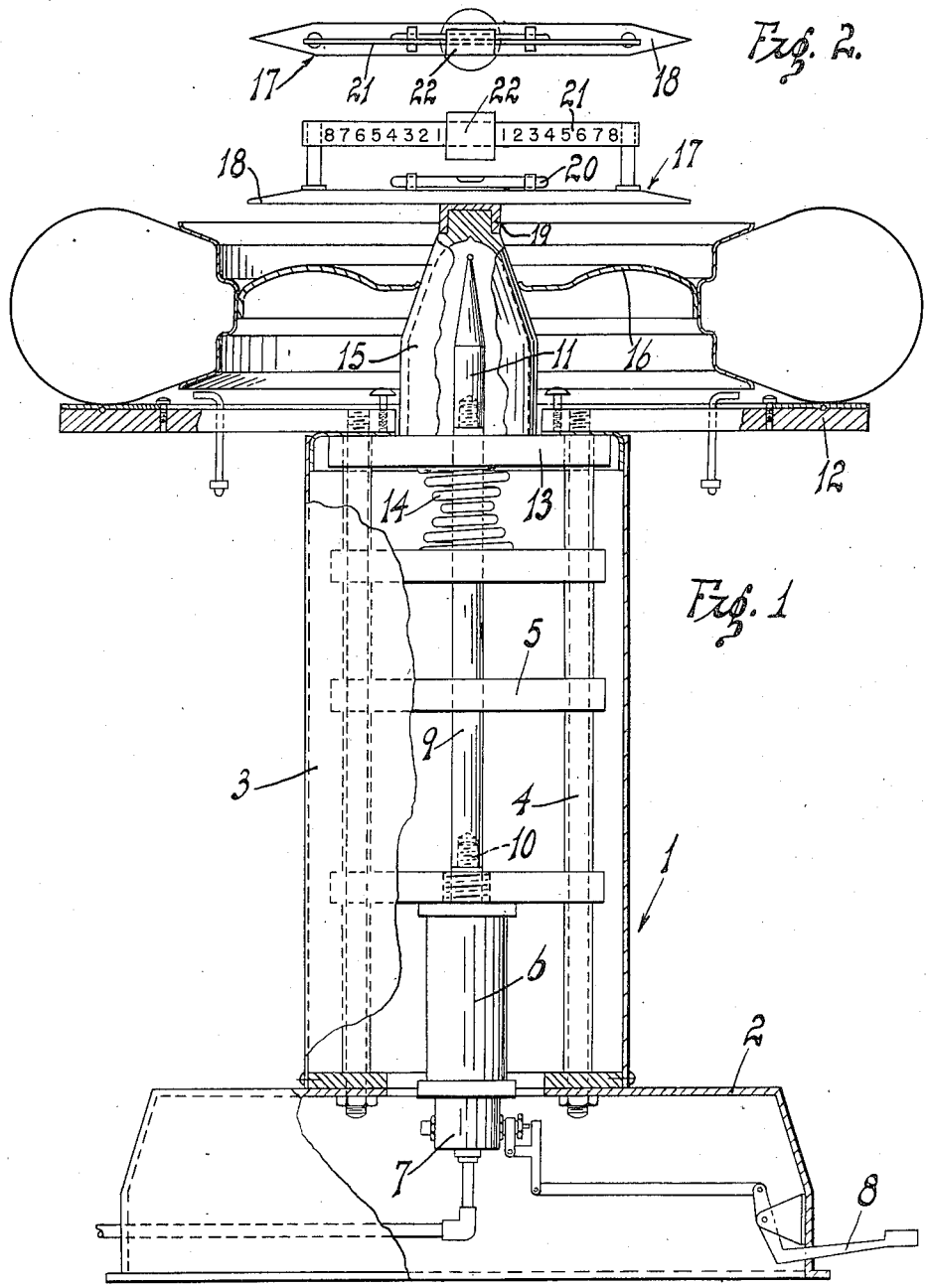
INVENTOR.
George H. Howard.
BY
ATTORNEY.

Patented Feb. 22, 1949

2,462,266

UNITED STATES PATENT OFFICE 2,462,266

STATIC WHEEL BALANCING APPARATUS

George H. Howard, Long Beach, Calif.

Application August 3, 1946, Serial No. 688,388

3 Claims. (Cl. 73—66)

This invention relates to a wheel weighing and tire removing machine whereby a tire and wheel may be statically balanced and while resting on the same machine, the operator may remove the tire or inspect the same, if necessary.

An object of my invention is to provide a wheel weighing and tire removing machine which is both simple in operation and easy to operate.

A feature of my invention resides in the means to pneumatically or hydraulically place the tire and wheel above the supporting table for the purpose of balancing the same.

Another feature of my invention is to provide a device of the character stated, in which the devices necessary for removing the tire may be quickly and easily mounted, and without materially changing the operation of the machine itself.

Still another feature of my invention is to provide a device of the character stated in which the supporting shaft for the wheel and tire may be moved either upwardly or downwardly as desired by the operator, and this movement is accomplished by a pneumatic or hydraulic cylinder.

Other objects, advantages and features of invention may appear from the accompanying drawing, the subjoined detailed description and the appended claims.

In the drawing:

Figure 1 is a side elevation of my tire balancing machine with parts broken away to show interior construction.

Figure 2 is a top plan view of the balance beam.

Referring more particularly to the drawing, the numeral 1 indicates a frame which includes a base 2 and a pedestal 3. The base and pedestal need not be of the specific construction here shown, but may be fabricated of any material which will provide a rigid and strong base.

As here shown, the pedestal 3 consists of a plurality of rods 4 and guide plates 5 mounted on these rods. An actuating cylinder 6, which may be either pneumatic or hydraulic is fixedly mounted in the pedestal 3, and preferably in the lower part thereof. The fluid which flows into and out of the cylinder 6 is controlled by a suitable valve 7, and this valve is usual and well known in the art. The valve 7 is controlled by the foot pedal 8, and this pedal is mounted in the base 2, substantially as shown. By manipulating the foot pedal 8, the operator can cause fluid to flow into the cylinder 6 in controlled quantities so as to raise the shaft 9, which extends vertically from the cylinder 6 and is suitably guided in the pedestal 3, these guides being the plates 5 or analogous devices.

The shaft 9 may be threaded to the piston of the cylinder 6, as shown at 10, or some other suitable method of attachment may be used.

As shown in Figure 1, a balance point 11 is attached to the upper end of the shaft 9 and the purpose of this balance point will be further described.

A work table 12 is mounted on top of the pedestal 3 in the following manner: The table is attached to the top of the pedestal and the rods 4 which extend into the table. A plate 13, slides on the rods 4, and is pressed upwardly against the table 12, in the following manner. One or more coil springs 14 bear against the plate 13, and yieldably press it upwardly. When my machine is being used to balance a wheel and tire, I provide a cone 15 which initially rests on the plate 13. The cone 15 is also centered in the work table 12, in that it passes through the work table and rests on the plate 13, as previously stated. The cone 15 is hollow and the balance point 11 extends into this cone, and when the shaft 9 is raised, the balance point will engage the top of the cone and will support the cone and the wheel and tire mounted thereon. The central hole of the wheel 16 rests on the cone 15 substantially as shown, and when the cone is raised, the entire wheel and tire will be raised above the work table 12. When the tire and wheel are thus supported in a horizontal plane, the heavy part of the tire will drop, indicating the heavy or unbalancing part of the wheel and tire.

A balance beam 17 is journaled on top of the cone 15 and is freely rotated. This balance beam includes a pointer 18 which includes the cup 19, whereby the beam is supported on the cone. A bubble lever 20 is mounted on the pointer 18 and the pointer also supports the scale 21, and the sliding weight 22 thereon.

When balancing a tire and wheel, the parts are first arranged as shown in Figure 1, that is, the wheel placed over the cone 15. The shaft 9 is now raised a sufficient amount so that the entire weight of the tire and wheel is supported on the balance point 11. The tire is also raised off of the work table 12. The heavy side of the tire will now drop. The pointer 18 is now swung to point towards the heavy point of the tire. By watching the bubble 20, it will be possible to accurately position the pointer 18. The weight 22 is now moved on the scale 21 until the tire is balanced. The scale 21 can be so calibrated that the numbers thereon will indicate the amount of unbalance of the tire.

Having described my invention, I claim:

1. In a wheel balancing device, a stand, a shaft mounted in said stand, means connected to said shaft to move the shaft vertically, and means on the upper end of said shaft adapted and arranged to receive a wheel, a pointer journaled on said last named means, said pointer being adapted to be moved in a substantially horizontal plane, a bubble level mounted on the pointer and a balance weight slidably mounted on the pointer.

2. In a wheel balancing device, a stand, a shaft mounted in said stand, means connected to said shaft to move the shaft vertically, and a cone mounted on the upper end of said shaft, said cone being adapted and arranged to receive a wheel, and a pointer journaled on said cone, said pointer being adapted to be moved in a substantially horizontal plane, a bubble level on the pointer and a balance weight slidably mounted on the pointer.

3. In a wheel balancing device, a stand, a shaft mounted in said stand, a power cylinder connected to said shaft to move the shaft vertically, a table mounted on said stand, a cone supported on the upper end of said shaft, said cone having a free swinging movement on the shaft, a pointer journaled on said cone, said pointer being adapted to be moved in a substantially horizontal plane, a bubble level on said pointer, and a balance weight slidably mounted on the pointer.

GEORGE H. HOWARD.

REFERENCES CITED

The following references are of record in the file of this patent:

UNITED STATES PATENTS

| Number | Name | Date |
|---|---|---|
| 1,701,464 | Kraft | Feb. 5, 1929 |
| 1,908,311 | Branick | May 9, 1933 |
| 2,270,657 | Kraft | Jan. 20, 1942 |
| 2,298,656 | Smith | Oct. 13, 1942 |
| 2,308,950 | Hulslander | Jan. 19, 1943 |
| 2,362,061 | Ewing | Nov. 7, 1944 |
| 2,373,975 | Plumeau | Apr. 17, 1945 |